United States Patent [19]

Mehling et al.

[11] Patent Number: 4,969,945
[45] Date of Patent: Nov. 13, 1990

[54] HOLDER FOR THE MOLD HALVES OF AN IS MACHINE FOR MAKING HOLLOW GLASS ARTICLES

[75] Inventors: Hans Mehling; Peter Schommartz, both of Essen; Joachim Wolter, Gladbeck, all of Fed. Rep. of Germany

[73] Assignee: Ruhrglas AG, Essen, Fed. Rep. of Germany

[21] Appl. No.: 375,974

[22] Filed: Jul. 6, 1989

[30] Foreign Application Priority Data

Jul. 8, 1988 [DE] Fed. Rep. of Germany ....... 3823152

[51] Int. Cl.$^5$ ............................................. C03B 9/353
[52] U.S. Cl. ....................................... 65/323; 65/361
[58] Field of Search ................. 65/323, 357, 359, 360, 65/361

[56] References Cited

U.S. PATENT DOCUMENTS 3,278,290 10/1966 Rowe ..................................... 65/323
4,878,935 11/1989 Zsifkovits .............................. 65/323

Primary Examiner—Joye L. Woodard
Attorney, Agent, or Firm—Herbert Dubno

[57] ABSTRACT

A holder for the mold halves of an IS machine for making hollow glass articles and parison or finished molds thereof, has an addition to the rockers allowing X-axis compensation for irregularities in the mold halves, a compensating device which affords compensation for irregularities with respect to a Y-axis and thus permits adjustment of the ends of the mold halves with respect to one another. The compensating device utilizes a vertical pin from which an arm projects to pivotally carry a vertical compensating lever whose upper and lower ends are pivotally connected to cover plates which, in turn, are connected to the respective mold half.

2 Claims, 2 Drawing Sheets

HOLDER FOR THE MOLD HALVES OF AN IS MACHINE FOR MAKING HOLLOW GLASS ARTICLES

FIELD OF THE INVENTION

Our present invention relates to a holder for the halves of a plurality of molds for making hollow glass articles on an IS machine and, more particularly, to a mold holder for a plurality of forms for the blowing of hollow glassware such as bottles.

BACKGROUND OF THE INVENTION

Utilizing an IS machine, gobs of glass in a plastically deformable state, are introduced into the molds of an IS machine and are shaped therein into hollow glassware. Various aspects of the process and apparatus are described, for example, in U.S. Pat. Nos. 4,298,371, 4,349,368, 4,473,389 and 4,343,644.

Particular attention is directed to European Patent Publication EP-No. 0253329 A1 which describes a holder for the halves of a plurality of forms for a parison and/or final form of a mold of an IS machine for the production of hollow glass articles. This holder comprises two carriers, one of which is equipped with one of the form halves while the other has two swingable rockers which are provided with the other form halves of the parison and/or finish forms or molds. The carrier thus is capable of providing the opening and closing movement whereby these other form halves move away from and toward the first form halves, respectively.

The holder of this latter patent publication has two carriers which are swingable about a common axis in a shear-type or scissor-type action for the opening and closing movements. The rockers provided on a carrier enable compensation for irregularities in the X-axis of the parison or finished-product form or mold.

OBJECTS OF THE INVENTION

It is the principal object of the present invention to provide an improved holder for the purposes described which allows not only a compensation for irregularities in the X-axis of the parison form or the finished form or mold, but also a compensation for irregularities in the Y-axis of such forms.

Another object of the invention is to provide a holder which represents an improvement over that described in the aforementioned European Patent Publication.

Still another object of our invention is to provide a mold or form holder for an IS machine which represents an improvement over earlier devices hitherto utilized in such machines.

SUMMARY OF THE INVENTION

These objects and others which will become apparent hereinafter are attained, in accordance with the invention, by providing one of the carriers on the upper end of which or on the upper end of the mold half of which and on the lower end of which or the lower end of the mold half of which a compensating device is affixed. With the aid of this compensating device it is possible especially with relatively high glass molds, to provide a compensation in the Y-axis for irregularities in the mold halves, thereby markedly improving the quality of the hollow glass articles which are fabricated therein.

Advantageously, the compensating device is provided on the carrier which is not provided with the rockers.

In the latter case, the rockers cannot only pivot about a vertical axis for X-axis compensation, but also can pivot about horizontal axes at their upper and lower ends, respectively.

According to a further feature of the invention, the carrier provided with the compensating device is formed with two spaced apart frames, plates or the like in which a centering pin in swingably journaled and about which an arm perpendicular to the pin or a like member is mounted. This arm carried by the pin, has a compensating lever swingable parallel to the centering pin. The compensating lever can have its two ends each swingably connected to an upper and lower cover plate, on which the upper and lower ends of the respective form halves are affixed. With this configuration or construction, it is possible to compensate for irregularities in the Y-axis of the glass molds as well, since the mold halves can pivot at least limitedly about respective horizontal axes at the upper and lower ends of these mold halves.

The opening and closing movements of the two carriers of a holder can be effected in the usual manner, either perpendicular to the separating plane of the mold halves or forms and thus parallel to one another, or by a swinging action toward and away from one another in a shear or scissor action.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
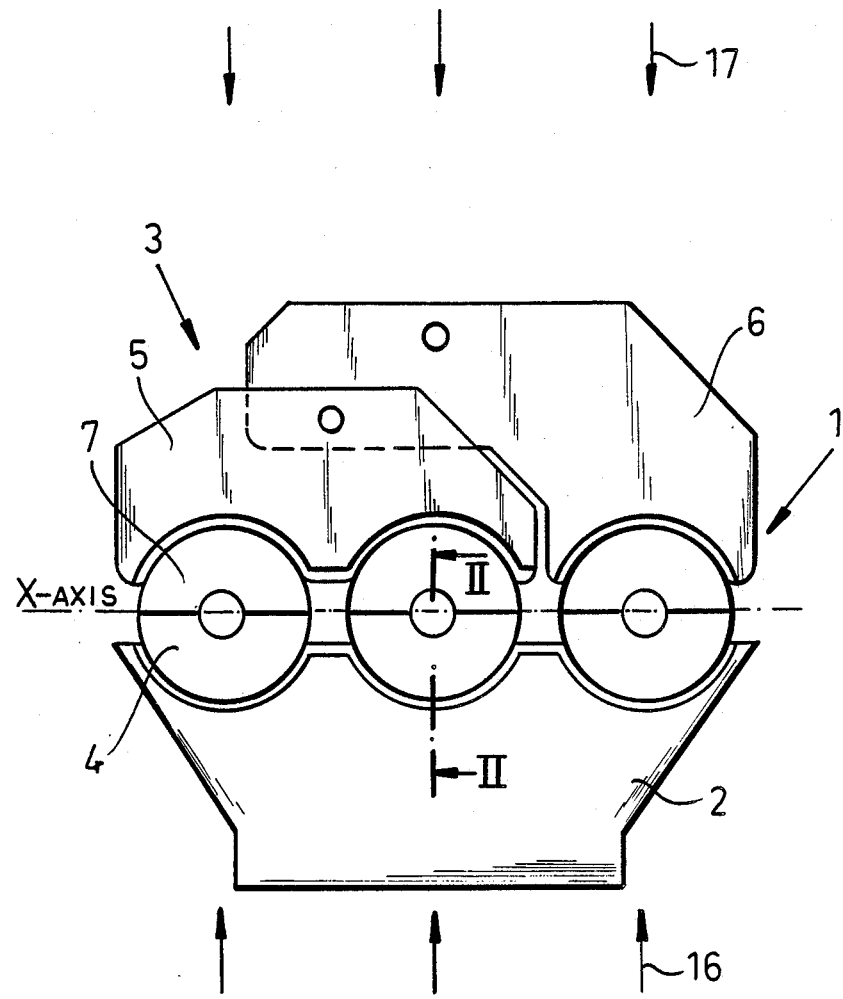
FIG. 1 is a plan view of a holder according to the invention.

The holder 1 shown in the drawing comprises two carriers 2 and 3. The carrier 2 is equipped with three mold or form halves 4, e.g. bottle-making mold halves.

The carrier 3 is provided with two relatively swingable rockers 5 and 6 which carry the opposite mold halves 7.

In the embodiment shown, the carrier 2 is provided with a compensating device according to the invention to allow irregularities in the mold halves to be compensated.

For this purpose, the carrier 2 is provided with two spaced apart frame plates 8 which are here shown to be disposed horizontally and in which a centering pin 9 is journaled at its upper and lower ends.

The centering pin 9 carries and is keyed to an arm 10 which projects perpendicularly to this pin, toward the other carrier.

A pivot 11' connects a compensating lever 11 to the arm 10 so that the lever 11 can lie generally parallel to the pin 9, but is swingable about a horizontal axis perpendicular to the arm 10.

At its upper and lower ends, the lever 11 is pivotally connected respectively to upper and lower cover plates 12 and 13.

The upper end 14 of the mold halves 4 are connected to the upper plate 12 and the lower end 15 of the mold halves 4 are connected to the lower plate 13 by tongue and groove connections 14' and 15', respectively, with play in a vertical plane.

Figure 2:
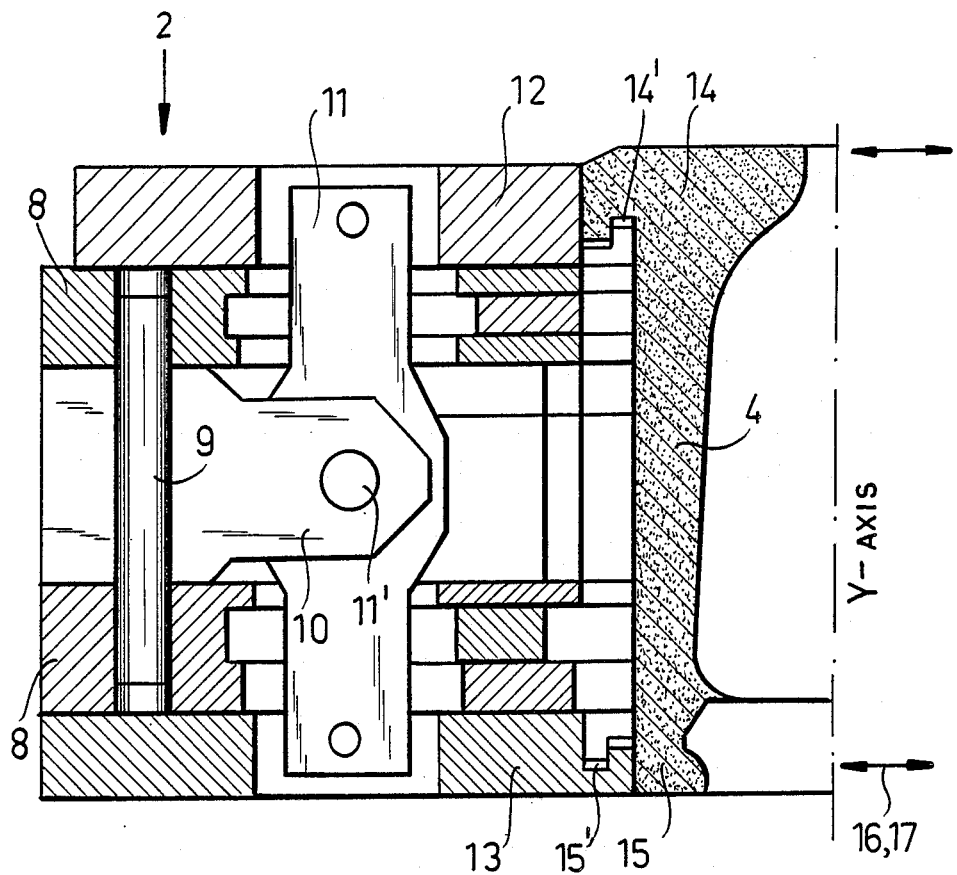
FIG. 2 is a partial section taken along the line II—II in FIG. 1 but wherein the section does not extend to the rockers.

As is especially apparent from FIG. 2, the compensating device 9–13 allows a compensation for irregularities in the mold halves in the Y-axis while the rockers 5 and 6 allow a compensation only for irregularities in the X-axis.

The holder of the invention is provided for a parallel shifting of the two carriers 2, 3 as represented by the arrows 16 and 17 for opening and closing of the molds, although a relative swinging action for opening and closing the molds is likewise possible.

We claim:

1. A holder for molds for the production of hollow glass articles is an IS machine, comprising:

two carriers displaceable toward and away from one another to close and open respective molds;

a plurality of mold halves mounted on one of said two carriers, the other of said two carriers being formed with a pair of mutually pivotable rockers carrying opposite mold halves; and a compensating device interposed between said one of said two carriers and the respective mold halves and operatively connected to upper and lower ends of the respective mold halves for enabling irregularities in the mold halves to be compensated with respect to an axis perpendicular to a compensation axis provided by pivotal movement of said rockers said compensating device comprising:

a pair of frame plates;

a centering pin extending parallel to a pivot axis of said rockers and having upper and lower ends engaged in said frame plates, an arm projecting perpendicularly from said centering pin, a compensating lever pivotally mounted on said arm and pivotable about an axis perpendicular to said centering pin, said compensating lever having upper and lower ends, upper and lower cover plates respectively pivotally connected to said upper and lower ends of said compensating lever, and means for connecting said cover plates to upper and lower ends of said mold halves provided on said one of said carriers.

2. A holder for molds for the production of hollow glass articles in an IS machine, comprising:

first and second displaceable carriers, each of said carriers being provided with a plurality of separable halves engaging one another to define a mold cavity lying in a first plane upon bringing said first and second carriers toward one another, said first carrier being provided with a plurality of rockers pivotable about respective pivot axes parallel to one another and extending parallel to said first plane, and a compensating device operatively connected with one of said carriers, said device including:

means for compensating irregularities in said mold cavity upon engaging said halves together in a second plane traversing said first plane, said means for compensating being formed with a lever lying in a respective lever plane parallel generally to said first plane and extending continuously between upper and lower ends of said mold halves of said one carrier, and means for mounting said lever on said one carrier so as to be swingable about another axis extending perpendicular to said pivot axes and operatively connected with said halves of said one carrier, so that said halves of said fist and second carrier are adjustable in said first and second planes extending perpendicular to one another.

* * * * *